United States Patent [19]
Windsor et al.

[11] 3,960,189
[45] June 1, 1976

[54] METHOD FOR PROCESSING TREES AND APPARATUS USED THEREIN
[75] Inventors: Robert N. Windsor, Brisbane, Australia; Stanley C. Jasinski, Woodstock, Canada
[73] Assignee: Eaton Yale Ltd., Canada
[22] Filed: Mar. 20, 1975
[21] Appl. No.: 560,662

[52] U.S. Cl. .............................. 144/3 D; 144/2 Z; 144/309 AC
[51] Int. Cl.² ......................................... A01G 23/08
[58] Field of Search ................. 144/2 Z, 3 D, 34 R, 144/34 E, 309 AC

[56] References Cited
UNITED STATES PATENTS

| | | | |
|---|---|---|---|
| 3,461,928 | 8/1969 | Siiro | 144/3 D |
| 3,618,647 | 11/1971 | Stuart, Jr. | 144/2 Z |
| 3,623,521 | 11/1971 | Shields | 144/2 Z |
| 3,643,711 | 2/1972 | Puna | 144/2 Z |
| 3,721,280 | 3/1973 | French | 144/2 Z |
| 3,889,729 | 6/1975 | Pinomaki | 144/3 D |

Primary Examiner—Othell M. Simpson
Assistant Examiner—W. D. Bray
Attorney, Agent, or Firm—Teagno & Toddy

[57] ABSTRACT

An improved method of processing a sheared tree is provided, utilizing an improved processing apparatus. The trunk of the tree is held, by a holding means, adjacent its butt end and the tree trunk is positioned lengthwise of the boom member of the apparatus. A first portion of the tree trunk is delimbed by moving a carriage, including a first delimbing means, along the trunk from the butt end to a first predetermined point. The carriage includes a gripping means which grips the trunk at a first gripping point intermediate the butt end and the first predetermined point. The hold on the tree trunk adjacent the butt end is released and a first bolt is bucked (severed), the first bolt being defined generally by the butt end and the first gripping point. A second portion of the tree trunk is delimbed by moving the carriage, the gripping means and the tree trunk gripped thereby, relative to a second delimbing means, toward the holding means, the second portion being defined by a gripping point and a second predetermined point along the tree trunk or the end of the usable portion of the trunk, whichever comes first. The second delimbing means is oppositely disposed along the boom member from the holding means. A second topping means is provided for topping a second bolt defined generally by the first gripping point and the second predetermined point, the second topping means being adjacent the second delimbing means along the boom member. The method and apparatus disclosed herein permits delimbing to occur during both the outward movement of the carriage and the return of the carriage, thus utilizing the entire operational cycle and permitting the delimbing of a tree trunk substantially longer than the travel of the carriage.

7 Claims, 6 Drawing Figures

METHOD FOR PROCESSING TREES AND APPARATUS USED THEREIN

BACKGROUND OF THE DISCLOSURE

The present invention relates to an improved method and apparatus for processing sheared trees, and more particularly, to a method and apparatus for processing trees which are substantially longer than the travel of the apparatus.

A typical tree processing apparatus includes a carriage having a delimber head, the carriage being movable outwardly along a boom to delimb the trunk of the sheared tree. When the carriage and delimber head reaches an outermost position, a pair of topping blades are actuated to cut off or top the outer end portion of the tree trunk. The delimbed and topped tree trunk is then deposited in a bunk.

Examples of prior art methods and apparatus for delimbing and topping trees include those illustrated in U.S. Pat. No. 3,693,679 and Canadian Patent No. 927,718. Typically, prior art processing methods and apparatus have placed a limitation on the height of the trees which could be processed because of the limitation imposed on the delimbing stroke of the apparatus by the overall length of the apparatus. For example, a known prior art processing apparatus or harvester had a 32 ft. delimbing stroke. In addition, the return stroke of the delimbing head in prior art harvesters has represented "lost motion", i.e., a portion of the operating cycle which is wasted. Thus, the length limitation and the cycle time of the entire delimbing and topping operation have heretofore placed a limitation on the volume of trees which could be processed (delimbed and topped) within a given length of time.

SUMMARY OF THE INVENTION

Accordingly, it is an object of the present invention to provide an improved method and apparatus for processing sheared trees in which the entire operating cycle of the apparatus is utilized for delimbing and topping the trunk.

It is another object of the present invention to provide such a method and apparatus for processing trees which makes it economically possible to harvest a wider range of tree sizes with a single piece of equipment, thus substantially increasing the volume of trees which may economically be harvested per acre.

It is a related but more specific object of the present invention to provide a method and apparatus for processing trees which makes it possible to process a taller tree and delimb and top a second bolt therefrom. It is a related object of the present invention to provide a processing method and apparatus which produces bolts of specified length, similar to a short wood operation, as well as random length logs, similar to a tree length operation.

It is an even more specific object of the present invention to provide a processing method and apparatus of the type utilizing a carriage with a delimber head mounted thereon which has an outward stroke and a return stroke, in which delimbing and subsequent severing can occur during both the outward stroke and return stroke.

These and other objects of the present invention, which will become apparent upon a reading of the following detailed description, are accomplished by the provision of a method of processing a sheared tree which comprises holding the trunk of the tree, by a holding means, adjacent the butt end of the sheared tree, then delimbing a first portion of the trunk, the first portion being defined by the butt end and a first predetermined point along the trunk of the tree. Next, the tree trunk is gripped at a first gripping point intermediate the butt end and the first predetermined point and the hold on the trunk adjacent the butt end is released while a first bolt is bucked or severed, the first bolt being defined generally by the butt end and the first gripping point. The tree trunk and the first gripping point thereof are moved relative to and past a set of delimbing blades in a direction toward the holding means to delimb a second portion of the trunk, the second portion being defined by the first predetermined point and a second predetermined point. Finally, a second bolt is severed, the second bolt being defined generally by the first gripping point and the second predetermined point. In many cases, the second bolt will be of a random length determined by the length of the remaining usable portion of the tree. Therefore, as used hereinafter, the term "second predetermined point" will be understood to include, as a reference point, the end of the usable portion of the tree.

In accordance with another aspect of the present invention, and to facilitate practicing the method described hereinabove, an improved apparatus for processing a sheared tree is provided. The apparatus comprises a boom member oriented longitudinally of the apparatus and a means for holding the tree adjacent its butt end, the means being pivotally mounted relative to the boom member to position the sheared tree lengthwise of the boom member. A carriage member is adapted for movement along the boom member and includes first means for delimbing a first portion of the tree trunk upon movement of the carriage member toward a first predetermined point along the tree trunk. The carriage member also includes means for gripping the tree trunk after movement of the carriage to a gripping point intermediate the butt end and the first predetermined point. The carriage member further includes first means for bucking a first bolt defined generally by the butt end and the gripping point. A second means is provided for delimbing a second portion of the tree trunk upon movement of the carriage, the gripping means and the tree trunk gripped thereby toward the holding means, the second portion being defined by the gripping point and a second predetermined point along the tree trunk. The second delimbing means is oppositely disposed along the boom member from the holding means and a second means is provided for topping a second bolt defined generally by the gripping point and the second predetermined point, the second topping means being adjacent the second delimbing means along the boom member.

BRIEF DESCRIPTION OF THE DRAWINGS

FIGS. 1 and 1(a) are elevational views of a tree harvester including the processing apparatus for practicing the processing method of the present invention.

DESCRIPTION OF THE PREFERRED EMBODIMENT

Figure 1:
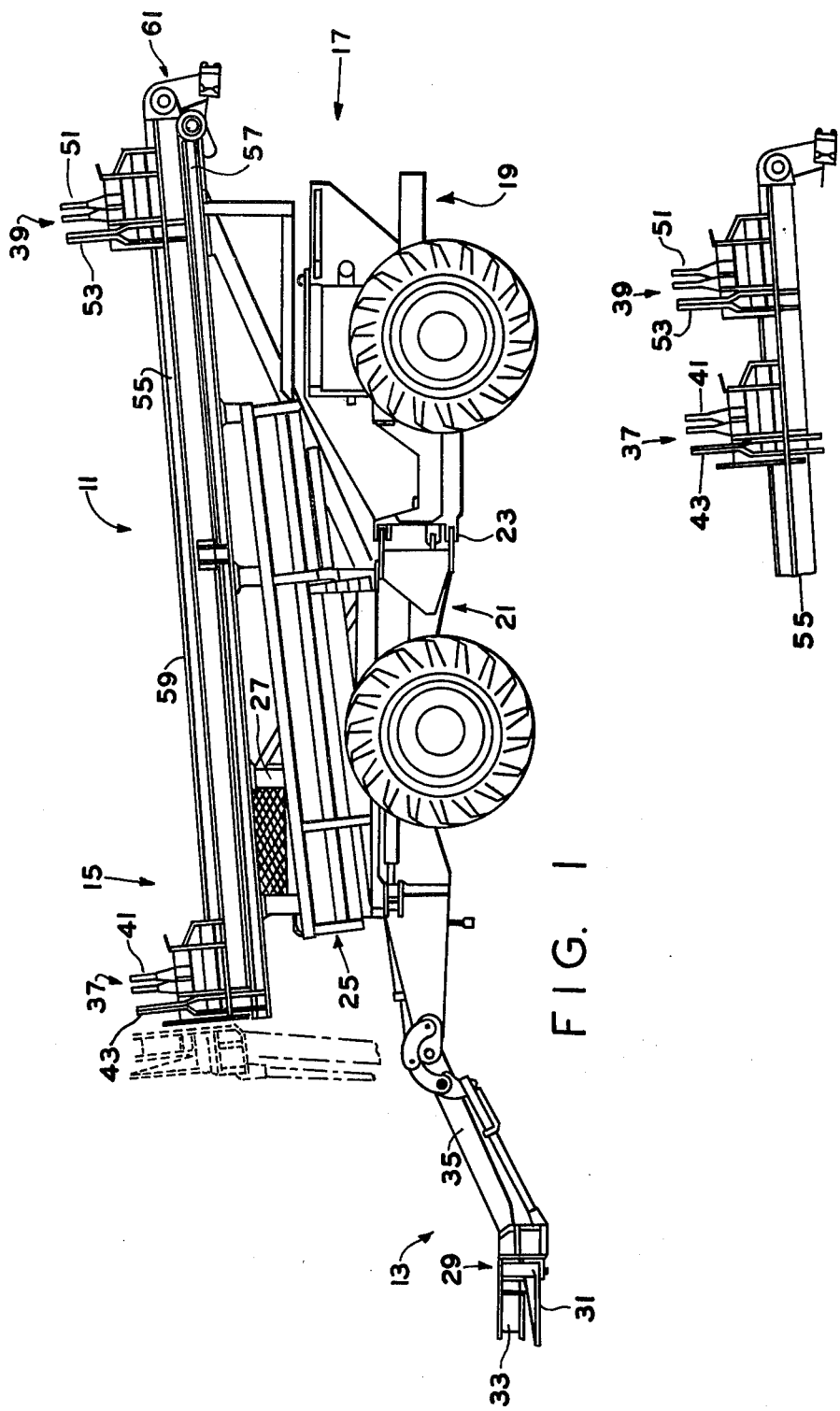

Referring now to the drawings, which are for the purpose of illustrating a preferred embodiment of the present invention and not for limiting the same, FIG. 1 is an elevational view of a tree harvesting apparatus, generally designated 11, and adapted for practicing the present invention. The tree harvesting apparatus 11 includes a felling assembly 13 which is operable to sever the trunk of a standing tree and position the felled tree in a delimber assembly 15. The delimber assembly 15 is mounted on an articulated vehicle 17 having a trailing end portion 19 which is connected to a leading end portion 21 at a pivot connection 23. After the processing operation has been performed on a severed tree by the delimber assembly 15, it is deposited in a bunk 25 which is mounted on one side of the vehicle 17, with an operator's cab 27 mounted on the opposite side of the delimber assembly 15, and in FIG. 1, partially hidden thereby.

The felling assembly 13 includes a felling head 29 having a shear 31 for severing a trunk of a standing tree. When a standing tree is to be felled, the felling head 29 is moved to the position shown in solid lines in FIG. 1 and clamp arms 33 are then closed to grip the tree trunk and the shear 31 is actuated. The felling head 29 is disposed at the end of an articulated boom 35 which is operated, after the severing of the tree, from the extended position shown in solid lines in FIG. 1 to the retracted position shown in dashed lines in FIG. 1, thereby positioning a felled tree trunk T in engagement with a forward delimber head 37 and a rear delimber head 39 in the manner illustrated schematically in FIG. 2. The construction and operation of the felling assembly 13 is substantially the saem as disclosed in U.S. patent application Ser. No. 449,045, filed Mar. 7, 1974, now U.S. Pat. No. 3,896,862, by Robert N. Windsor and entitled "Tree Harvesting Apparatus" (73-FED-104), which is incorporated herein by reference, and reference should be made thereto for additional information.

The forward delimber head 37 includes a plurality of delimbing blades, generally designated 41, and, disposed forwardly thereof, a set of bucking shear blades 43. Similarly, the rear delimber head 39 includes a plurality of delimbing blades, generally designated 51, and disposed forwardly thereof, a set of topping blades 53.

The forward delimber head 37 is movable in an axially outward direction (toward the right in FIG. 1) from the retracted position shown in FIG. 1. This is accomplished by moving a delimber carriage 55 axially outward along a delimber boom 57 until the forward delimber head 37 has moved from its retracted position to its fully extended position shown in the fragmentary view of FIG. 1(a). During this outward movement of the delimber carriage 55, the forward delimber head 37 is moved outwardly along a longitudinally extending guide track 59 on the delimber carriage 55 by a delimber head drive arrangement 61. It should be noted here that the details of the construction and operation of the forward delimber head 37 and rear delimber head 39 may be very similar to each other and to those disclosed in U.S. patent application Ser. No. 449,044, filed Mar. 7, 1974, now U.S. Pat. No. 3,894,568 by Robert N. Windsor and entitled "Tree Harvesting Apparatus" (74-FED-103), which is incorporated herein by reference. Similarly, reference should be had to the above-identified application for further information concerning the construction and operation of the delimber head drive arrangement 61, as the specific details of the delimber heads 37 and 39 and delimber head drive arrangement 61 form no part of the present invention.

The operation of the tree processing method and apparatus of the present invention may best be understood by reference to FIGS. 2–5 which illustrate schematically the method of the present invention.

As it was described previously, the felling assembly 13 is utilized to sever the trunk T of a standing tree and grip the trunk T adjacent its sheared or butt end 63, and then position the trunk lengthwise of the delimber boom 57 and in engagement with the delimber heads 37 and 39. Initially, the clamp arms 33 remain actuated to maintain a tight grip on the trunk adjacent the butt end 63 to prevent longitudinal movement of the trunk during the delimbing operation.

Figure 2:
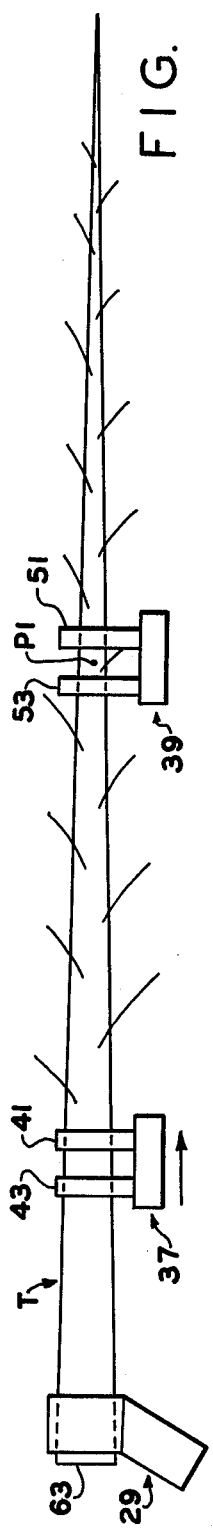
FIGS. 2–5 are schematic illustrations depicting the relationships of the elements of the processing apparatus during the various steps of the processing method disclosed herein.
Figure 3:
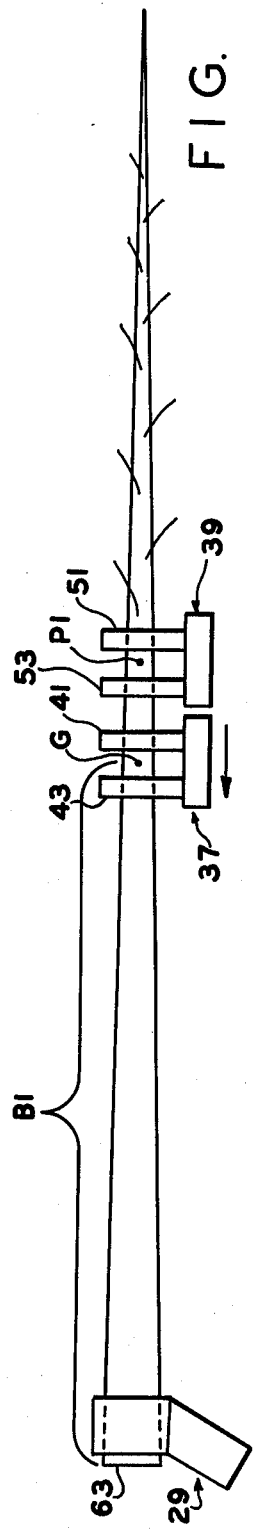

FIG. 2 illustrates the delimbing of a first portion of the trunk with the forward delimber head 37 moving in an axially outward direction (as shown by the arrow) toward a first predetermined point P1 adjacent the rear delimber head 39 which, preferably remains stationary during the entire sequence of operations. The approximate location of the point P1 is therefore determined by the longitudinal travel of the forward delimber head 37. As is shown in FIG. 1, the longitudinal movement of the delimber head 37 relative to the stationary trunk, with the delimber blades 41 actuated to be in a "delimbing relationship" adjacent the tree trunk, causes the delimbing of a first portion of the trunk, which is defined generally by the butt end 63 and the point P1. At the end of the travel of forward delimber head 37 toward point P1 as illustrated in FIG. 2, the head 37 stops and, as shown in FIG. 3, is retracted a short distance, generally about one foot, to a gripping point G where the delimbing blades 41 are further actuated to engage the tree trunk and prevent a longitudinal movement of the trunk with respect to the blades 41. At the same time, the grip maintained by the felling head 29 (more specifically, by the clamp arms 33), is released. It will be apparent that a separate gripping device may be provided on the forward delimber head 37, although for reasons of simplicity and economy, it is preferred to employ the delimber blades 41 for the gripping function also, in which case it should be noted that the apparatus must include means for actuating the blades 41 with both a "delimbing pressure" and a "gripping pressure". Referring again to FIG. 3, once the trunk has been gripped near gripping point G and released adjacent butt end 63, the blades 43 may then be actuated to buck or sever a first bolt B1, the bolt B1 extending generally from butt end 63 to gripping point G.

Figure 4:
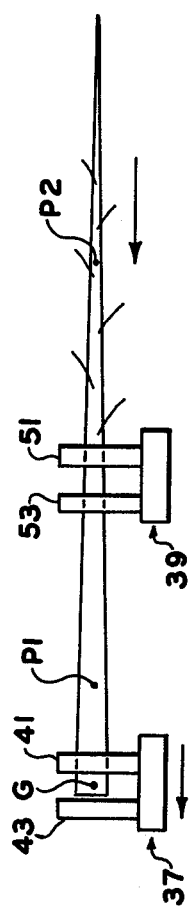

Referring now to FIG. 4, it may be seen that the bolt B1 has been removed (i.e., has been positioned in the bunk 25), and the forward delimber head 37 is again moving axially inward, i.e., toward the felling head 29. It should be noted that the delimber blades 51 have been actuated to a delimbing relationship adjacent the tree trunk, preferably even before the initial retraction or inward movement of the delimber head 37. The retraction of the forward delimber head 37 illustrated in FIG. 4 has previously represented substantially wasted time, but in utilizing the method and apparatus of the present invention, the retraction of the forward delimber head 37 may now be utilized to delimb a second portion of the tree trunk, the second portion extending generally from the first predetermined point P1 to a second predetermined point P2.

Figure 5:
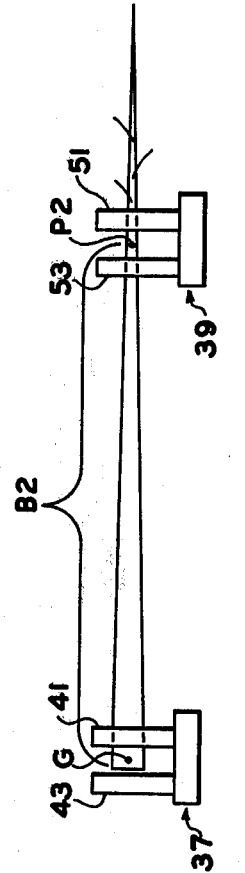

Referring now to FIG. 5, the forward delimber head 37 has been retracted a sufficient distance to place the second predetermined point P2 adjacent the rear delimber head 39, thus completing the delimbing of the second portion of the trunk, the portion defined by points P1 and P2. It will be apparent that the length of the second delimbed portion is limited by the distance which the forward delimber head 37 must be retracted. Thus, in utilizing the present invention, the total length of tree trunk that may be delimbed and severed into bolts is from about 1 to about 2 times the available travel distance of the delimber head 37 which, in the subject embodiment, is approximately 32 feet.

Referring again to FIG. 5, once the forward delimber head 37 has stopped its axially inward movement, the topping blades 53 are actuated to sever a second bolt B2, which is then released from the grip of the delimber blades 41 or other gripping means adjacent thereto and positioned in the bunk 25 along with the bolt B1. It has been found desirable in utilizing the method and apparatus of the present invention to harvest or process a tree having approximately 54 feet of usable trunk, such that the initial 32 foot delimbing stroke illustrated in FIG. 2 and the 1 foot retraction of the head 37 illustrated in FIG. 3 provides about a 31 foot bolt B1, and an additional retraction of the head 37 of about 22 feet provides a bolt B2 having a length of about 23 feet, for a total bolt length of 54 feet.

It should also be noted that because the portion of the operating cycle illustrated in FIGS. 4 and 5 involves the retraction of forward delimber head 37 to its normal, retracted position as illustrated in FIG. 1, it is now possible for the operator to maneuver the tree harvesting apparatus 11 to such a position that the felling assembly 13 may be actuated and the next tree trunk severed and gripped by clamp arms 33, during the steps of FIGS. 2–5, then positioned lengthwise of the boom as soon as the forward delimber head 37 reaches the retracted position.

The invention has been described in great detail sufficient to enable one of ordinary skill in the art to make and use the same. Obviously, modifications and alterations of the preferred embodiments will occur to others upon a reading and understanding of the specification and it is my intention to include all such modifications and alterations as part of my invention insofar as they come within the scope of the appended claims.

I claim:

1. A method of processing a sheared tree comprising:
   a. holding the trunk of the tree, by a holding means, adjacent the butt end of the sheared tree;
   b. delimbing a first portion of the trunk, said first portion being defined by said butt end and a first predetermined point along the trunk of the tree;
   c. gripping the tree trunk at a gripping point intermediate said butt end and said first predetermined point;
   d. releasing the hold on the trunk adjacent said butt end;
   e. severing a first bolt defined generally by said butt end and said gripping point;
   f. subsequent to step (e), moving the tree trunk minus said first bolt relative to and past a set of delimbing blades in a direction towards said holding means to delimb a second portion of the trunk; and
   g. severing a second bolt.

2. The method of harvesting according to claim 1 including, simultaneous with steps (f) and (g), preparing to shear a subsequent tree.

3. A method of processing a sheared tree utilizing a processing apparatus, the method comprising:
   a. holding the trunk of the tree, by a holding means, adjacent its butt end to maintain the tree trunk longitudinally fixed relative to said apparatus;
   b. delimbing a first portion of the trunk by moving a delimbing means along the trunk from said butt end to a first predetermined point;
   c. gripping the tree trunk with a gripping means at a first gripping point intermediate said butt end and said first predetermined point;
   d. releasing the hold on the trunk adjacent said butt end;
   e. severing a first bolt defined generally by said butt end and said first gripping point;
   f. providing a stationary set of delimbing blades closely spaced about the trunk adjacent said first predetermined point;
   g. moving said gripping means subsequent to step (e) to move said tree trunk toward said holding means to delimb a second portion of the trunk, said second portion being defined by said first predetermined point and a second predetermined point; and
   h. severing a second bolt defined generally by said first gripping point and said second predetermined point.

4. A method of processing according to claim 3 including, simultaneous with steps (f)–(h), positioning said apparatus to prepare for shearing a subsequent tree.

5. Apparatus for processing a sheared tree, comprising:
   a. a boom member oriented longitudinally of said apparatus;
   b. means for holding the tree adjacent its butt end, said means being pivotally mounted relative to said boom member to position the sheared tree lengthwise of said boom member;
   c. a carriage member adapted for movement along said boom member, said carriage member including first means for delimbing a first portion of the tree trunk upon movement of said carriage member toward a first predetermined point along the tree trunk;
   d. said carriage member further including means for gripping the tree trunk after movement of said carriage to a first gripping point intermediate said butt end and said first predetermined point;
   e. said carriage member further including first means for severing a first bolt defined generally by said butt end and said first gripping point;
   f. a second means for delimbing a second portion of the tree trunk upon movement of said carriage, said gripping means, and the tree trunk gripped thereby toward said holding means, said second portion being defined by said gripping point and a second predetermined point along the tree trunk, said second delimbing means being oppositely disposed along said boom member from said holding means; and g. second means for topping a second bolt defined generally by said first gripping point and said second predetermined point, said second topping means being adjacent said second delimbing means along said boom member.

6. The apparatus of claim 5 wherein each of said first and second delimbing means comprises a plurality of blades movable from an open condition spaced apart from the tree trunk to a closed condition with said blades in delimbing relationship adjacent the tree trunk.

7. The apparatus of claim 6 wherein said gripping means comprises said first plurality of blades being operable to engage the tree trunk to prevent relative longitudinal movement between the trunk and said blades.

* * * * *